US008537152B2

(12) United States Patent
Kobashi et al.

(10) Patent No.: US 8,537,152 B2

(45) **Date of Patent: *Sep. 17, 2013**

(54) SEMICONDUCTOR CIRCUIT, DRIVING CIRCUIT OF ELECTRO-OPTICAL DEVICE, AND ELECTRONIC APPARATUS

(75) Inventors: Yutaka Kobashi, Mizuho (JP); Takashi Toya, Gifu (JP)

(73) Assignee: Epson Imaging Devices Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/526,931

(22) Filed: Jun. 19, 2012

(65) Prior Publication Data

US 2012/0256891 A1 Oct. 11, 2012

Related U.S. Application Data

(60) Division of application No. 12/914,228, filed on Oct. 28, 2010, which is a continuation of application No. 11/348,793, filed on Feb. 7, 2006, now Pat. No. 7,847,759.

(30) Foreign Application Priority Data

Mar. 8, 2005 (JP) ................................ 2005-063422

(51) Int. Cl.
*G06F 3/038* (2013.01)

(52) U.S. Cl.
USPC .............................. 345/212; 345/204; 345/76

(58) Field of Classification Search
USPC .................................................. 345/204, 212
See application file for complete search history.

(56) References Cited

U.S. PATENT DOCUMENTS

| | | | | |
|---|---|---|---|---|
| 6,247,162 | B1 | 6/2001 | Fujine et al. | |
| 6,274,895 | B1 | 8/2001 | Fujii et al. | |
| 6,548,858 | B2 * | 4/2003 | Cheng | 257/324 |
| 6,707,139 | B2 | 3/2004 | Fujii et al. | |
| 6,724,149 | B2 * | 4/2004 | Komiya et al. | 315/169.3 |
| 6,825,826 | B1 | 11/2004 | Mikami et al. | |
| 7,023,415 | B2 | 4/2006 | Fujita et al. | |
| 7,136,311 | B2 * | 11/2006 | Fujikawa | 365/189.11 |
| 7,224,338 | B2 | 5/2007 | Yamada | |
| 7,358,950 | B2 | 4/2008 | Yamashita et al. | |
| 7,535,439 | B2 * | 5/2009 | Nitta et al. | 345/75.2 |
| 7,545,347 | B2 | 6/2009 | Kanda | |
| 7,760,314 | B2 | 7/2010 | Iwanaga et al. | |
| 7,772,766 | B2 * | 8/2010 | Aoki | 313/506 |

(Continued)

FOREIGN PATENT DOCUMENTS

| | | |
|---|---|---|
| JP | 03-191550 | 8/1991 |
| JP | 05-206276 | 8/1993 |

(Continued)

*Primary Examiner* — Bipin Shalwala
*Assistant Examiner* — Afroza Chowdhury
(74) *Attorney, Agent, or Firm* — Harness, Dickey & Pierce, P.L.C.

(57) ABSTRACT

A semiconductor circuit includes a first circuit block, a second circuit block, and power wiring lines that supply a plurality of reference potentials. The first circuit block and the second circuit block are connected to a common power wiring line that is one of the power wiring lines and supplies a common reference potential. A width of the common power wiring line in the first circuit block is smaller than a width of the common power wiring line in the second circuit block.

27 Claims, 8 Drawing Sheets

(56) References Cited

U.S. PATENT DOCUMENTS

| | | | | |
|---|---|---|---|---|
| 7,847,759 | B2 * | 12/2010 | Kobashi et al. | 345/76 |
| 7,872,355 | B2 * | 1/2011 | Owa | 257/776 |
| 7,880,853 | B2 | 2/2011 | Iwanaga et al. | |
| 7,978,169 | B2 * | 7/2011 | Yamashita et al. | 345/100 |
| 8,264,476 | B2 * | 9/2012 | Nonaka | 345/204 |
| 2002/0011976 | A1 * | 1/2002 | Hashimoto | 345/76 |
| 2004/0007778 | A1 | 1/2004 | Shinozaki et al. | |
| 2004/0246427 | A1 | 12/2004 | Iwanaga et al. | |
| 2005/0062353 | A1 | 3/2005 | Brown | |
| 2005/0152189 | A1 | 7/2005 | Kim et al. | |
| 2005/0162353 | A1 | 7/2005 | Kanda | |
| 2005/0179039 | A1 * | 8/2005 | Nonaka | 257/72 |
| 2005/0219192 | A1 * | 10/2005 | Fujikawa | 345/98 |
| 2006/0158095 | A1 * | 7/2006 | Imamura | 313/500 |
| 2006/0169909 | A1 * | 8/2006 | Oka | 250/372 |
| 2007/0246827 | A1 * | 10/2007 | Owa | 257/734 |
| 2008/0150924 | A1 * | 6/2008 | Yamashita et al. | 345/204 |
| 2009/0160848 | A1 * | 6/2009 | Tsuchi | 345/214 |
| 2011/0037754 | A1 * | 2/2011 | Kobashi et al. | 345/211 |
| 2011/0107284 | A1 * | 5/2011 | Owa | 716/111 |
| 2011/0273491 | A1 * | 11/2011 | Iida et al. | 345/690 |
| 2013/0063406 | A1 * | 3/2013 | Nishino et al. | 345/204 |
| 2013/0076603 | A1 * | 3/2013 | Taneda et al. | 345/76 |

FOREIGN PATENT DOCUMENTS

| | | |
|---|---|---|
| JP | 06-027439 | 2/1994 |
| JP | 07-273635 | 10/1995 |
| JP | 09-069569 | 3/1997 |
| JP | 11-338431 | 12/1999 |
| JP | 2000-077609 | 3/2000 |
| JP | 2003-066475 | 3/2003 |
| JP | 2003-308049 | 10/2003 |
| JP | 2004-004512 | 1/2004 |
| JP | 2004274335 | 9/2004 |
| JP | 2004361722 | 12/2004 |

* cited by examiner

SEMICONDUCTOR CIRCUIT, DRIVING CIRCUIT OF ELECTRO-OPTICAL DEVICE, AND ELECTRONIC APPARATUS

CROSS-REFERENCE TO RELATED APPLICATIONS

This is a divisional continuation application of U.S. Ser. No. 12/914,228 filed Oct. 28, 2010, which is a continuation of U.S. Ser. No. 11/348,793 filed Feb. 7, 2006, now U.S. Pat. No. 7,847,759 issued Dec. 7, 2010 which claims priority to Japanese Patent Application No. 2005-063422 filed Mar. 8, 2005 all of which are hereby expressly incorporated by reference in their entireties.

BACKGROUND

1. Technical Field

The present invention relates to a semiconductor circuit, a driving circuit of an electro-optical device, and an electronic apparatus.

2. Related Art

A semiconductor circuit realizes complex functions by combining a plurality of circuit blocks. For example, a driving circuit for driving an electro-optical device, such as a liquid crystal display device or the like, has a plurality of circuit blocks divided among various functions. To each of the circuit blocks, a power supply voltage for operating circuit elements is supplied. The power supply voltages may be different depending on the circuit blocks.

Since the resistance of a power wiring line for supplying the power supply voltage is limited, if large current flows, a potential on the wiring line is temporarily changed. Further, if a current having a density equal to or more than a constant value flows in the power wiring line, the power wiring line may be disconnected due to Joule heat, migration, or the like, and the semiconductor circuit may be defective. The above-described problems can be avoided by increasing the width of the power wiring line and lowering the electrical resistance of the power wiring line and current density. However, if the width of the power wiring line is increased according to a maximum instantaneous current consumption value, the area of the semiconductor circuit is also increased by that amount.

JP-A-7-273635 suggests a method of controlling the width of the power wiring line by suppressing the maximum instantaneous current consumption of an output amplifier. JP-A-9-69569 suggests a method of optimizing the width of the power wiring line for a voltage which is different according to the circuit block.

The functions for which the semiconductor circuit is requested is complicated. For example, a driving circuit of an electro-optical device is accelerated and massive as an electro-optical device is enlarged with high definition. For this reason, it is necessary to further suppress the increase of the circuit area by keeping the width of the power wiring line to the necessary minimum, while preventing the power wiring line from being disconnected due to migration.

SUMMARY

An advantage of some aspects of the invention is that it provides a semiconductor circuit which suppresses an increase of a circuit area by keeping a width of a power wiring line to a necessary minimum, while preventing the power wiring line from being disconnected due to migration or the like, a driving circuit of an electro-optical device, and an electronic apparatus.

In order to solve the above-described problems, the invention provides the following.

According to a first aspect of the invention, a semiconductor circuit includes a first circuit block, a second circuit block, and power wiring lines that supply a plurality of reference potentials. In this case, the first circuit block and the second circuit block are both connected to a common power wiring line that is one of the power wiring lines and supplies a common reference potential. Further, a width of the common power wiring line in the first circuit block is smaller than a width of the common power wiring line in the second circuit block.

According to this configuration, the semiconductor circuit sets the width of the common power wiring line for supplying the common reference potential separately in the first circuit block and the second circuit block. That is, as for the common power wiring line for supplying the common reference potential, the width of the power wiring line in the first circuit block is made smaller than the width of the common power wiring line in the second circuit block. Accordingly, it is possible to further suppress an increase in the circuit area of the semiconductor circuit by keeping the width of the power wiring line to a necessary minimum, while preventing the power wiring line from being disconnected due to migration or the like.

According to a second aspect of the invention, a driving circuit of an electro-optical device, which has a plurality of scanning lines and a plurality of data lines, switching units correspondingly connected to the scanning lines and the data lines, and pixel electrodes arranged to correspond to the switching units, includes a first circuit block, a second circuit block, and power wiring lines that supply a plurality of reference potentials. In this case, the first circuit block and the second circuit block are both connected to a common power wiring line that is one of the power wiring lines and supplies a common reference potential. Further, a width of the common power wiring line in the first circuit block is smaller than a width of the common power wiring line in the second circuit block.

According to this configuration, the width of the common power wiring line for supplying the common reference potential is set separately in the first circuit block and the second circuit block in the driving circuit of an electro-optical device. That is, the width of the power wiring line in the first circuit block is made smaller than the width of the power wiring line in the second circuit block. Accordingly, it is possible to further suppress an increase in the circuit area of the driving circuit of an electro-optical device by keeping the width of the power wiring line to a necessary minimum, while preventing the power wiring line from being disconnected due to migration or the like.

In the driving circuit of an electro-optical device according to the second aspect of the invention, it is preferable that the first circuit block have a shift register with a unit circuit that, in synchronization with a clock signal, transmits a signal to be output to the scanning lines or the data lines, and the second circuit block have a buffer circuit that drives the scanning lines or the data lines.

According to this configuration, the first circuit block and the second circuit block have different functions. Therefore, in general, the current consumption of the first circuit block is different from the current consumption of the second circuit block. The width of the common power wiring line is set from the current consumption in the individual power wiring lines, and thus, even when the same power supply voltage is supplied to the circuit blocks, the width of the power wiring line suitable for each power wiring line or for each circuit block can be separately set. Therefore, it is possible to further suppress an increase in the circuit area of the driving circuit of an electro-optical device by keeping the width of the power wiring line to the necessary minimum, while preventing the power wiring line from being disconnected due to migration or the like.

In the driving circuit of an electro-optical device according to the second aspect of the invention, it is preferable that the first circuit block have a shift register with a unit circuit that, in synchronization with a clock signal, transmits a signal to be output to the scanning lines or the data lines, and a clock control circuit that, based on a judgment of whether data to be transmitted has a significant level or not, controls the supply of the clock signal to the unit circuit.

According to this configuration, in the first circuit block, the supply of the clock signal to a portion where a state is not changed even when the clock signal is supplied can stop, and thus the current consumption can be suppressed. The width of the power wiring line is set from the current consumption in the individual power wiring lines, and thus, in view of the stop of the supply of the clock signal, the width of the power wiring line in the first circuit block can be suppressed. For example, it is preferable that, in the first circuit block having the clock control circuit, the width of the power wiring line be set to be proportional to a second power of a diagonal screen size, while, in the second circuit block, the width of the power wiring line be set to be proportional to a third power of the diagonal screen size. Therefore, it is possible to further suppress an increase in the circuit area of the driving circuit of an electro-optical device by keeping the width of the power wiring line to the necessary minimum, while preventing the power wiring line from being disconnected due to migration or the like.

In the driving circuit of an electro-optical device according to the second aspect of the invention, it is preferable that the first circuit block have a shift register with a unit circuit that, in synchronization with a clock signal, transmits a signal to be output to the scanning lines or the data lines, and the second circuit block have a level shift circuit that boosts a signal to be input from an external circuit for driving the driving circuit of an electro-optical device.

In the level shift circuit, a normal leakage current of an order of several μA to tens μA constantly flows. On the other hand, the current consumption of the first circuit block tends to be simply proportional to the diagonal screen size of the electro-optical device. For this reason, when the diagonal screen size of the electro-optical device is small, a ratio of the normal leakage current of the level shift circuit occupying the current consumption of the second circuit block is dominant, and a difference in the current consumption between the first circuit block and the second circuit block is conspicuous. Here, since the width of the power wiring line is set from the current consumption in the individual power wiring lines, the width of the common power wiring line suitable for each of the first circuit block and the second circuit block can be separately set. Therefore, it is possible to further suppress an increase in the circuit area of the driving circuit of an electro-optical device by keeping the width of the power wiring line to the necessary minimum, while preventing the power wiring line from being disconnected due to migration or the like.

In the driving circuit of an electro-optical device according to the second aspect of the invention, it is preferable that the first circuit block have a shift register with a unit circuit that, in synchronization with a clock signal, transmits a signal to be output to the scanning lines or the data lines, and the second circuit block have a buffer circuit outputting a signal to be input from an external circuit for driving the driving circuit of an electro-optical device to the first circuit block with a signal rising and falling time in a predetermined range.

According to this configuration, the first circuit block and the second circuit block have different functions. Therefore, in general, the current consumption of the first circuit block is different from the current consumption of the second circuit block. The width of the power wiring line is set from the current consumption in the individual power wiring lines, and thus, even when the same power supply voltage is supplied to the circuit blocks, the width of the power wiring line suitable for each power wiring line or for each circuit block can be separately set. Therefore, it is possible to further suppress an increase in the circuit area of the driving circuit of an electro-optical device by keeping the width of the power wiring line to the necessary minimum, while preventing the power wiring line from being disconnected due to migration or the like.

In the driving circuit of an electro-optical device according to the second aspect of the invention, it is preferable that the first circuit block have a shift register with a unit circuit that, in synchronization with a clock signal, transmits a signal to be output to the scanning lines or the data lines, and the second circuit block have a DA converter circuit for driving the data lines with a predetermined potential.

The DA converter circuit generally has a ladder resistor or an amplifier, and has large current consumption, as compared with a general logic circuit, such as a clock generating circuit (CGC) or the like, for example. On the other hand, the current consumption of the first circuit block tends to be simply proportional to the diagonal screen size of the electro-optical device. For this reason, when the diagonal screen size of the electro-optical device is small, a ratio of the current consumption of the DA converter circuit of the second circuit block is increased, and the difference in current consumption between the first circuit block and the second circuit block is conspicuous. Here, since the width of the power wiring line is set from the current consumption in the individual power wiring lines, the width of the common power wiring line suitable for each of the first circuit block and the second circuit block can be separately set. Therefore, it is possible to further suppress an increase in the circuit area of the driving circuit of an electro-optical device by keeping the width of the power wiring line to the necessary minimum, while preventing the power wiring line from being disconnected due to migration or the like.

In the driving circuit of an electro-optical device according to the second aspect of the invention, it is preferable that a first driving voltage, which is a difference between a maximum and a minimum from the plurality of reference potentials to be supplied to the first circuit block, be different from a second driving voltage, which is a difference between a maximum and a minimum from the plurality of reference potentials to be supplied to the second circuit block.

According to this configuration, the first circuit block and the second circuit block have the power wiring lines for supplying different reference potentials, other than the common power wiring line, and have different driving voltages. In this case, in view of the current consumption in the individual power wiring lines, the width of the common power wiring line suitable for each of the first circuit block and the second circuit block can be separately set. Therefore, it is possible to further suppress an increase in the circuit area of the driving circuit of an electro-optical device by keeping the width of the power wiring line to the necessary minimum, while preventing the power wiring line from being disconnected due to migration or the like.

In the driving circuit of an electro-optical device according to the second aspect of the invention, it is preferable that a potential to be supplied to the common power wiring line be different from a ground potential which is supplied to the driving circuit.

According to this configuration, the potential, other than the ground potential, can be supplied by the common power wiring line, and the width of the common power wiring line can be separately set for each circuit block. Here, the reference potential VD, which has the highest reference potential, can be used as the common power wiring line. Therefore, it is possible to further suppress an increase in the circuit area of the driving circuit of an electro-optical device by keeping the width of the power wiring line to the necessary minimum, while preventing the power wiring line from being disconnected due to migration or the like.

Further, according to a third aspect of the invention, an electro-optical device includes, on the same substrate, the driving circuit, a plurality of scanning lines and a plurality of data lines, switching units that are correspondingly connected to the scanning lines and the data lines, and pixel electrodes that are correspondingly connected to the switching units. According to this configuration, it is possible to further suppress an increase in the circuit area of the driving circuit of an electro-optical device.

Further, according to a fourth aspect of the invention, an electronic apparatus includes the electro-optical device. According to this configuration, it is possible to further suppress an increase in the circuit area, and thus it is possible to provide an electronic apparatus which is suitable for a reduction in size with advanced capability.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
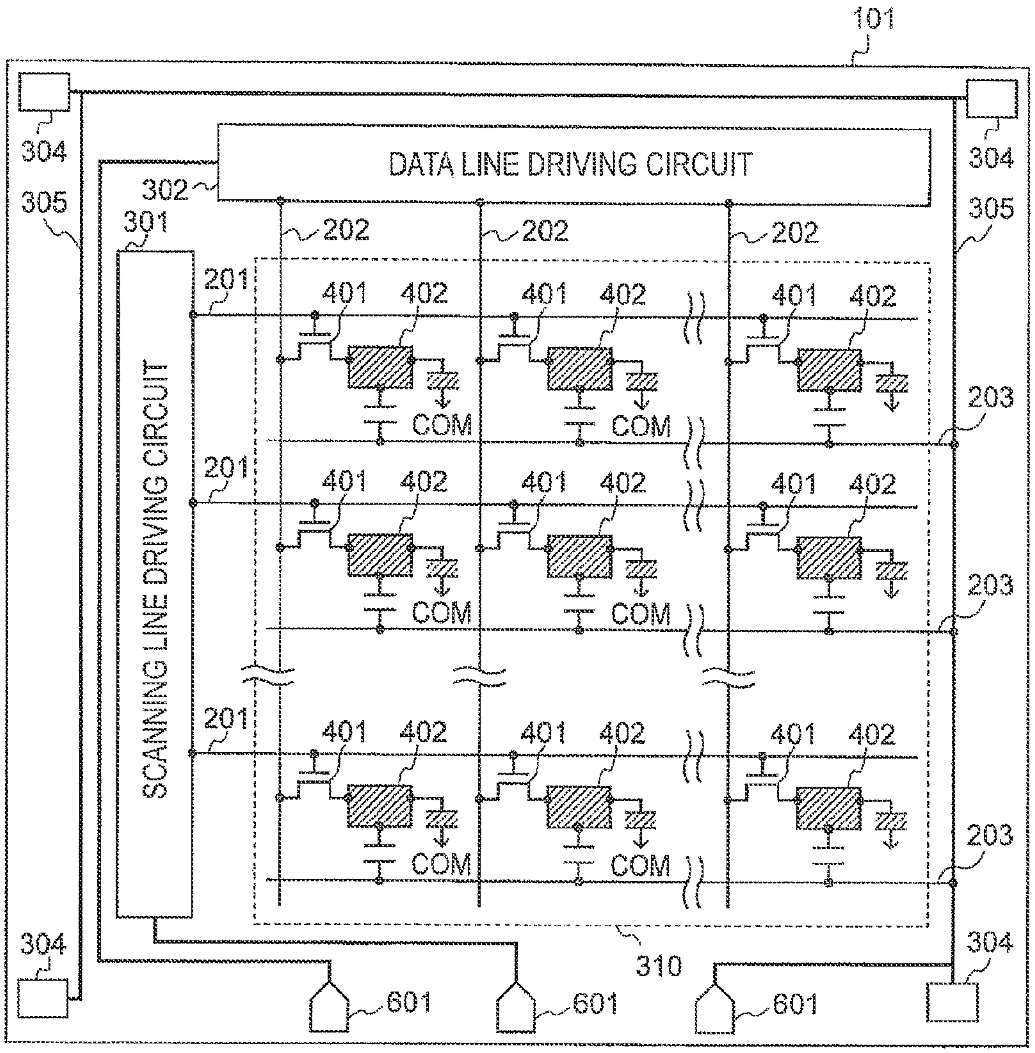
FIG. 1 is a diagram showing a configuration of an active matrix substrate 101 in which a driving circuit of a liquid crystal display device is incorporated.

FIG. 1 is a diagram showing the configuration of an active matrix substrate 101 in which a driving circuit of a liquid crystal display device according to a first embodiment of the invention is incorporated. Here, a liquid crystal display device serving as an electro-optical device has a plurality of scanning lines 201 and a plurality of data lines 202, switching units 401 that have n-type thin film transistors (TFTs) using polysilicon thin films and are correspondingly connected to the scanning lines 201 and the data lines 202, and pixel electrodes 402 that are correspondingly connected to the switching units 401.

Specifically, on the active matrix substrate 101 of no-alkali glass which is included in the liquid crystal display device serving as the electro-optical device 100, the plurality of scanning lines 201 and the plurality of data lines 202 are formed to cross to each other in a display region 310. Further, on the active matrix substrate 101, a data line driving circuit 302 and a scanning line driving circuit 301 serving as a driving circuit are formed, which are formed by integrating thin film transistors (TFTs) using polysilicon thin films. Here, the data line driving circuit 302, the scanning line driving circuit 301, and the switching units 401 are manufactured with the same manufacturing process.

The data lines 202 are connected to the data line driving circuit 302 to be driven, and the scanning lines 201 are connected to the scanning line driving circuit 301 to be driven. The number of scanning lines 201 and the number of data lines 202 are different according to resolution of the liquid crystal display device. For example, in the case of a liquid crystal display device of VGA resolution, the number of scanning lines 201 is 480 and the number of data lines 202 is 1920.

To the scanning line driving circuit 301 and the data line driving circuit 302, required electrical signals or potentials are supplied through mounting terminals 601.

Further, on the active matrix substrate 101, a plurality of common lines (capacitor lines) 203 are arranged in parallel and alternately with the scanning lines 201. The common lines 203 are short-circuited through a common wiring line 305, and are connected to opposing connecting portions 304 for the connection to a common electrode of a counter substrate.

In the display region 310 on the active matrix substrate 101, the switching units 401, which have N-channel field effect thin film transistors, are correspondingly formed at intersections of the scanning lines 201 and the data lines 202. A gate electrode of each of the switching units 401 is connected to a corresponding one of the scanning lines 201, a source electrode thereof is connected to a corresponding one of the data lines 202, and a drain electrode thereof is connected to a corresponding one of the pixel electrodes 402. If the liquid crystal display device is assembled, a counter electrode COM of the counter substrate is connected to the common lines 203 through the opposing connecting portions 304. Further, each of the pixel electrodes 402 and the counter electrode COM form a liquid crystal capacitor with a liquid crystal material as an electro-optical material interposed therebetween. Further, in parallel with the liquid crystal capacitor, an auxiliary capacitor is formed by a capacitor electrode of a pixel potential and each of the common lines 203.

Figure 2:
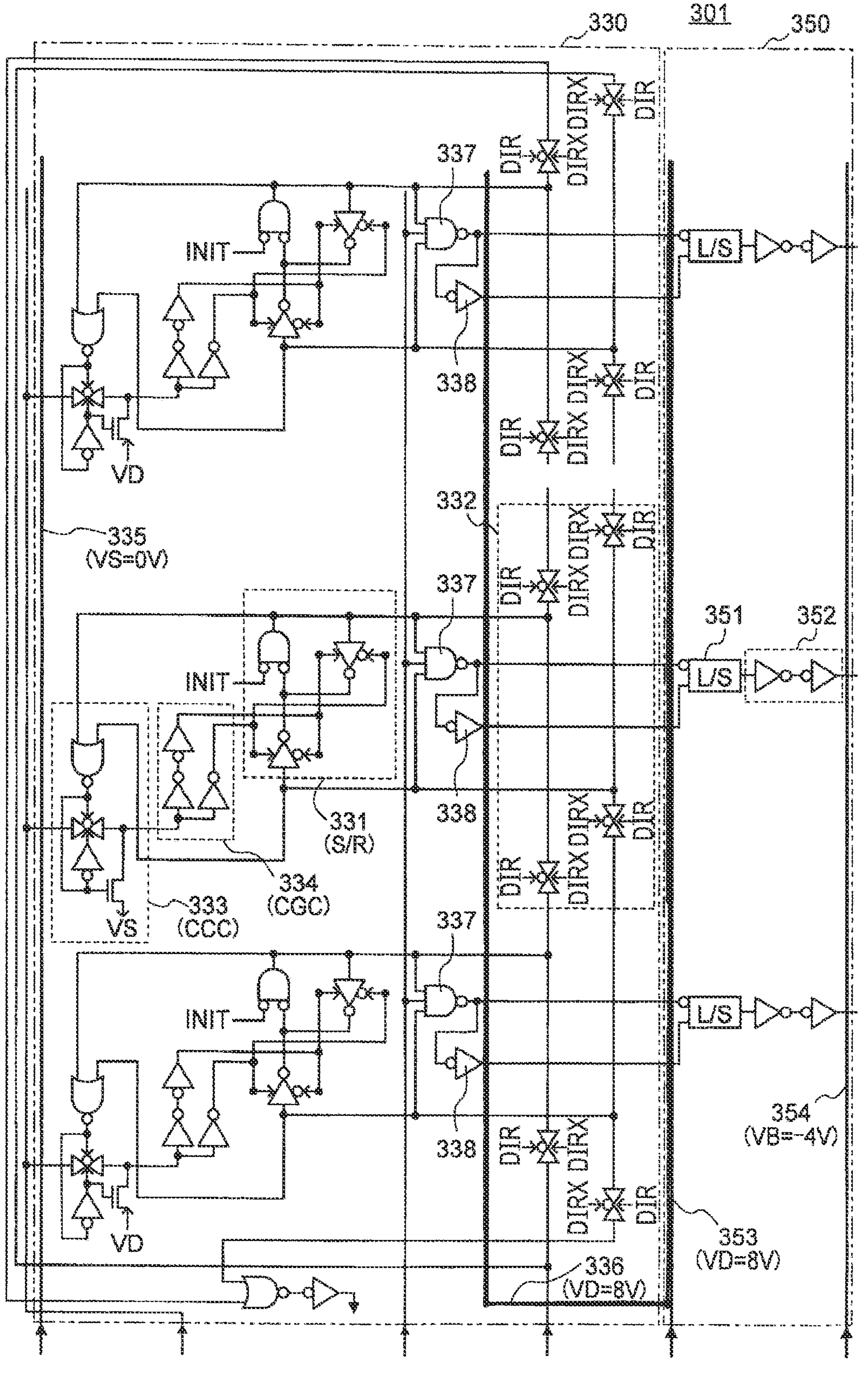
FIG. 2 is a circuit diagram showing a configuration of a scanning line driving circuit 301 according to a first embodiment of the invention.

FIG. 2 is a circuit diagram showing the configuration of the scanning line driving circuit 301. The scanning line driving circuit 301 has a first circuit block 330, a second circuit block 350, and power wiring lines that supply a plurality of reference potentials.

The first circuit block 330 is a logic circuit block having a clock control circuit (CCC) 333, a clock generating circuit (CGC) 334, a unit shift circuit (S/R) 331, a bidirectional transfer circuit 332, a NAND circuit 337, an inverter circuit 338. The first circuit block 330 is driven with 8 V, for example.

The bidirectional transfer circuit 332 is a circuit that easily realizes a screen inversion by switching between forward and reverse transfer directions based on a direction signal (DIR signal) and a reverse direction signal (DIRX signal). When the direction signal (DIR signal) is 0 V and the reverse direction signal (DIRX signal) is 8 V, a signal is transmitted to the bidirectional transfer circuit 332 from the below to the above in FIG. 2. On the other hand, when the direction signal (DIR signal) is 8 V and the reverse direction signal (DIRX signal) is 0 V, a signal is transmitted to the bidirectional transfer circuit 332 from the above to the below in FIG. 2.

The unit shift circuit (S/R) 331 as a unit circuit is a latch circuit that outputs an input signal in synchronization with a clock signal. A plurality of unit shift circuits (S/R) 331 and the bidirectional transfer circuit 332 for connecting the unit shift circuits (S/R) 331 in a cascade manner forms a shift register. To the shift register, a start signal indicating the start of a frame period is input. The unit shift circuits (S/R) 331 sequentially shift and output signals to be output to the scanning lines 201 in synchronization with the clock signal.

In order to prevent an increase in the electrostatic capacitance of a clock line, the clock control circuit (CCC) 333 supplies the clock signal to stages previous and next to a stage, which is driven to H level, from the shift register and stops the supply of the clock signal to other stages.

The clock generating circuit (CGC) 334 is a circuit that generates a bipolar clock signal required for the operation of the unit shift circuit (S/R) 331 from a uni-polar clock signal so as to prevent an erroneous operation due to phase misalignment between positive and negative clocks.

Figure 3:
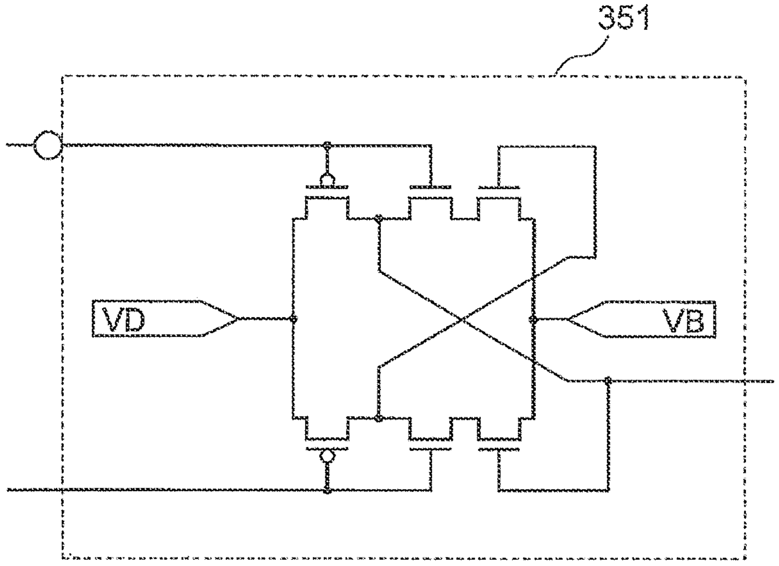
FIG. 3 is a diagram showing a configuration of a level shift circuit 351.

The second circuit block 350 is an external interface circuit block having a level shift circuit (L/S) 351 that boosts a low-amplitude signal to be output from the first circuit block 330 to a high-amplitude signal, and a buffer circuit 352 that drives the scanning lines 201, to which a plurality of switching circuits are connected, by an output signal of the level shift circuit (L/S) 351. FIG. 3 is a circuit diagram showing the level shift circuit (L/S) 351 in detail, which is a so-called flip-flop-type level shift circuit.

Power wiring lines 335, 336, 353, and 354 supply a plurality of reference potentials VS, VD, and VB to the scanning line driving circuit 301. For example, the reference potential VS serving as a ground potential is set to 0 V, the reference potential VD is set to 8 V, and the reference potential VB is set to −4 V. The power wiring lines 336 and 353 supply the common reference potential VD to the first circuit block 330 and the second circuit block 350. The power wiring line 335 supplies the reference potential VS to the first circuit block 330. The power wiring line 354 supplies the reference potential VB to the second circuit block 350.

The first circuit block 330 receives 8 V as the common reference potential VD and 0 V as VS, and operates with 8 V. The second circuit block 350 receives 8 V as the common reference potential VD and −4 V as VB, and operates with 12 V.

In the first circuit block 330 is driven with a low-potential power supply voltage of 8 V so as to reduce current consumption. On the other hand, the level shift circuit (L/S) 351 the second circuit block 350 boosts a signal from 8 V to 12 V and writes the boosted signal into the scanning line 201, such that sufficient writing into the pixel electrode 402 is performed. Further, the high reference potential VD is common to the first circuit block 330 and the second circuit block 350 with 8 V. In addition, the low reference potential VS in the first circuit block 330 is 0 V and the low reference potential VB in the second circuit block 350 is −4 V, such that the power wiring line can serve as the common power wiring line. By making the reference potential in common in such a manner, the number of mounting terminals and external power supply ICs can be reduced, manufacturing costs can be made low, and a circuit area can be reduced.

Moreover, the power wiring lines are connected to power supply nodes of circuit elements constituting an individual circuit, but, in the drawings, for convenience, the connection to the circuit elements will be omitted.

Here, the width of each of the power wiring lines of the first circuit block 330 and the second circuit block 350 will be described.

In the case of driving a normal liquid crystal display device, for example, only one scanning line 201 from the 480 scanning lines 201 is simultaneously selected and driven in the H level. At this time, from the unit shift circuits (S/R) 331 constituting the shift register, two stages output the H level corresponding to the selected scanning line 201. In this case, the clock control circuit (CCC) 333 needs to supply the clock signal only to the unit shift circuits (S/R) 331 of four stages, that is, the two stages in the H level and the previous and next stages thereof. The 476 remaining stages are in a latch state in which the output of the L level is maintained, and thus the supply of the clock signal to the portion where the state is not changed even when the clock signal is supplied stops. Therefore, the current consumption of the first circuit block 330 becomes almost the current consumption of the circuit corresponding to the four stages. Further, the current consumption is proportional to a driving frequency of the scanning line 201, and the driving frequency of the scanning line 201 of the first circuit block 330 is proportional to the number of scanning lines 201. That is, if a frame frequency is constant, the current consumption of the first circuit block 330 is proportional to the number of scanning lines 201, as represented by the following equation 1.

$$\text{Current Consumption of First Circuit Block } 330 \propto \text{Driving Frequency of Scanning Line } 201 \propto \text{The Number of Scanning Lines } 201 \quad (1)$$

Therefore, when the diagonal screen size becomes large or the fineness is increased and thus the number of scanning lines 201 and the number of driver stages in increased, basically, the current consumption of the first circuit block 330 is primarily increased by the number of scanning lines 201.

On the other hand, the current consumption of the second circuit block 350 is proportional to a product of the driving frequency of the scanning line 201 and the electrostatic capacitance of the scanning line 201, as represented by the following equation 2.

$$\text{Current Consumption of Second Circuit Block } 350 \propto \text{Driving Frequency of Scanning Line } 201 \times \text{Electrostatic Capacitance of Scanning Line } 201 \quad (2)$$

If the fineness and the frame frequency are constant, the number of scanning lines 201, the electrostatic capacitance of the scanning line 201, and the driving frequency of the scanning line 201 are proportional to the diagonal screen size of the display region 310.

In the above-described case, the current consumption of the first circuit block 330 is proportional to the number of scanning lines 201, and the number of scanning lines 201 is proportional to the diagonal screen size. That is, the current consumption of the first circuit block 330 is proportional to the diagonal screen size, as represented by the following equation 3.

$$\text{Current Consumption of First Circuit Block } 330 \propto \text{Diagonal Screen Size} \quad (3)$$

Further, the current consumption of the second circuit block 350 is proportional to the product of the driving frequency of the scanning line 201 and the electrostatic capacitance of the scanning line 201, and the driving frequency of the scanning line 201 and the electrostatic capacitance of the scanning line 201 are proportional together to the diagonal screen size. That is, the current consumption of the second circuit block 350 is proportional to a second power of the diagonal screen size, as represented by the following equation 4.

$$\text{Current Consumption of Second Circuit Block } 350 \propto (\text{Diagonal Screen Size})^2 \quad (4)$$

Here, a voltage drop of the power supply in a power wiring line terminal is a product of the current consumption of the power supply and resistance of the power wiring line, as represented by the following equation 5.

$$\text{Voltage Drop of Power Supply} = \text{Current Consumption of Power Supply} \times \text{Resistance of Power Wiring Line} \quad (5)$$

Further, resistance of the power wiring line is proportional to a quotient of a length of the power wiring line and the width of the power wiring line, as represented by the following equation 6.

$$\text{Resistance of Power Wiring Line} \propto \text{Length of Power Wiring Line}/\text{Width of Power Wiring Line} \quad (6)$$

In addition, the length of the power wiring line approximates to the size of the scanning line driving circuit 301 on the substrate, and the size of the scanning line driving circuit 301 on the substrate approximates to a longitudinal screen size, and the longitudinal screen size is proportional to the diagonal screen size. That is, the length of the power wiring line is proportional to the diagonal screen size, as represented by the following equation 7.

$$\text{Length of Power Wiring Line} \cong \text{Size of Scanning Line Driving Circuit 301 on Substrate} \cong \text{Longitudinal Screen Size} \propto \text{Diagonal Screen Size} \quad (7)$$

Therefore, if the width of the power wiring line is set such that the voltage drop by the power wiring line is equal to or less than a constant value, the minimum width of the power wiring line in the first circuit block 330 is proportional to a second power of the diagonal screen size, as represented by the following equation 8.

$$\text{Minimum Width of Power Wiring Line in First Circuit Block } 330 \propto (\text{Diagonal Screen Size})^2 \quad (8)$$

Further, the minimum width of the power wiring line in the second circuit block 350 is proportional to a third power of the diagonal screen size, as represented by the following equation 9.

$$\text{Minimum Width of Power Wiring Line in Second Circuit Block } 350 \propto (\text{Diagonal Screen Size})^3 \quad (9)$$

For example, when the diagonal screen size is 4 inches, resolution of the display screen is VGA, fineness is 200 ppi, an aspect ratio is 4:3, and the frame frequency is 60 Hz, optimally, the width of the power wiring line in the logic circuit block serving as the first circuit block 330 becomes 30 μm, and the width of the power wiring line in the external interface circuit block serving as the second circuit block 350 becomes 100 μm. Therefore, the width of the power wiring line 335 and the width of the power wiring line 336 are set to 30 μm, respectively, and the width of the power wiring line 353 and the width of the power wiring line 354 are set to 100 μm, respectively.

As such, in the first circuit block 330 and the second circuit block 350, the current consumption is different, and thus the widths of the power wiring lines suitable for the first circuit block 330 and the second circuit block 350 can be set. That is, by making the voltage drop in the power wiring line within a constant range so as to prevent the power wiring line from being disconnected due to migration or the like, and keeping the width of the power wiring line to a necessary minimum, an increase in the circuit area of the driving circuit of the liquid crystal display device can be further suppressed. Accordingly, a frame of the liquid crystal display device can be made small, and manufacturing costs can be reduced. As apparent from FIGS. 8 and 9, this effect becomes conspicuous as the screen size becomes large or the fineness becomes high.

Moreover, though the scanning line driving circuit 301 using the shift register has been described herein, the shift register of the invention is not limited to this configuration. A shift register that transmits the signals by the unit circuits and in which the clock signal is controlled by the clock control circuit (CCC) 333 may be used. For example, a linear-sequential selecting circuit using flip-flop circuits or the like, or a logic circuit, such as a timing generator using a counter circuit or the like, may be used.

Second Embodiment

In the present embodiment, the configuration of a circuit that boosts a low-amplitude signal to a high-amplitude signal is different from that in the first embodiment.

Figure 4:
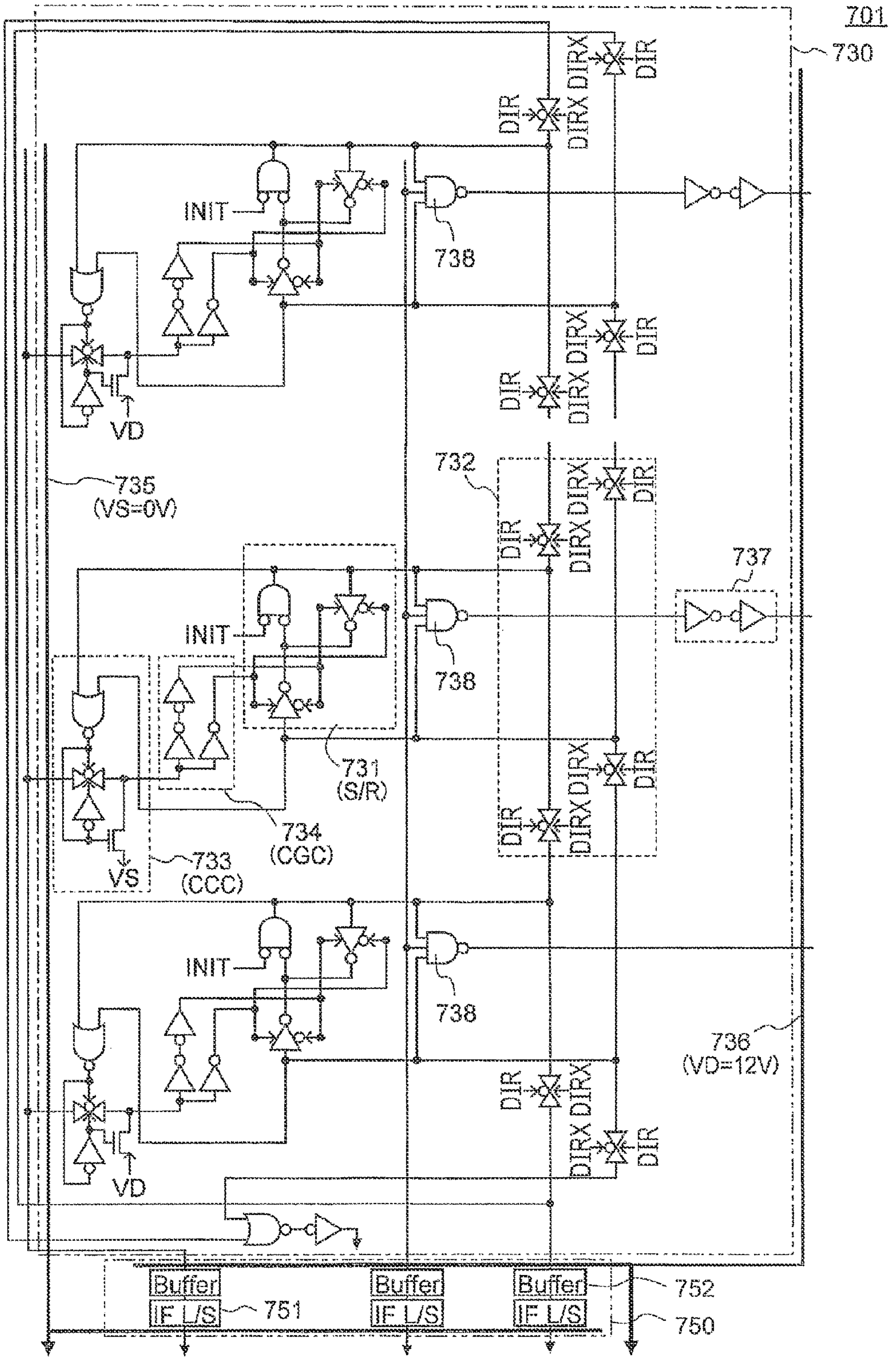
FIG. 4 is a circuit diagram showing a configuration of a scanning line driving circuit 701 according to a second embodiment of the invention.

FIG. 4 shows a scanning line driving circuit 701 of the second embodiment. The scanning line driving circuit 701 has a first circuit block 730, a second circuit block 750, and power wiring lines that supply a plurality of reference potentials.

The first circuit block 730 is a logic circuit block having a clock control circuit (CCC) 733, a clock generating circuit (CGC) 734, a unit shift circuit (S/R) 731, a bidirectional transfer circuit 732, a first buffer circuit 737, and a NAND circuit 738. The first circuit block 730 and the second circuit block 750 are driven with 12 V, for example.

The bidirectional transfer circuit 732, the unit shift circuit (S/R) 731 as a unit circuit, the clock control circuit (CCC) 733, and the clock generating circuit (CGC) 734 are the same as those in the first embodiment. Further, the first buffer circuit 737 is a buffer circuit that drives the scanning signals 201, to which a plurality of switching circuits are connected, by an output signal from the unit shift circuit (S/R) 731.

The second circuit block 750 is an external interface circuit block having an interface level shift circuit (IF L/S) 751, and a second buffer circuit 752.

Figure 5:
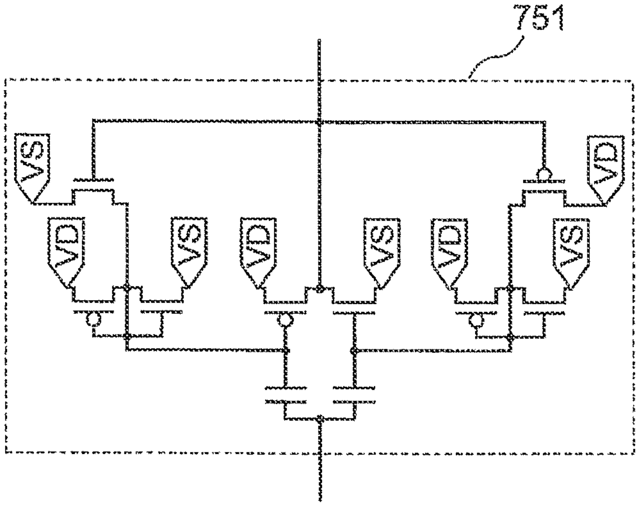
FIG. 5 is a diagram showing a configuration of an interface level shift circuit 751.

The interface level shift circuit (IF L/S) 751 is a circuit which boosts the low-amplitude signal to be input from an external circuit, such as an external IC or the like, to the high-amplitude signal in order to drive the driving circuit of the electro-optical device. FIG. 5 is a circuit diagram showing the interface level shift circuit (IF L/S) 751 in detail. In a so-called capacitive coupled level shift circuit, like the present embodiment, even when a polysilicon thin film transistor having relatively low ability is used, an output ratio of three to four times can be realized, but a leakage current normally flows.

The second buffer circuit 752 is a circuit that increases driving ability of a signal to be output from the interface level shift circuit (IF L/S) 751 so as to meet a rising and falling time of a signal required for normally operating the first circuit block 730. Like the buffer circuit 352, the second buffer circuit 752 is implemented by connecting a plurality of inverter circuits in series.

Power wiring lines 735 and 736 supply a plurality of reference potentials VS and VD to the first circuit block 730. For example, the reference potential VS serving as the ground potential is set to 0 V, and the reference potential VD is set to 12 V. Further, power wiring lines 755 and 756 supply reference potentials VS and VD to the second circuit block 750.

The power wiring line 735 and the power wiring line 755, and the power wiring line 736 and the power wiring line 756 are short-circuited on a substrate 101, and the first circuit block 730 and the second circuit block 750 receive 12 V as the common reference potential VD and 0 V as the common reference potential VS, and operate with 12 V.

In the present embodiment, the signal of 12 V needs to be input to the first circuit block 730, but an IC, which can output a high voltage amplitude of 12 V, is expensive. For this reason, the signal from the external circuit, such as the external IC or the like, is set to the amplitude of 3 V, and the interface level shift circuit (IF L/S) 751 boosts the signal from 3 V to 12 V. In addition, driving ability is increased by the second buffer circuit 752.

The first circuit block 730 and the second circuit block 750 are driven with 12 V. In this case, the high reference potential VD is common to the first circuit block 730 and the second circuit block 750 with 12 V, and the low reference potential VS is common to the first circuit block 730 and the second circuit block 750 with 0 V, such that the common power wiring line can be made.

Moreover, the power wiring lines are connected to power supply nodes of circuit elements constituting an individual circuit, but, in the drawings, for convenience, the connection to the circuit elements will be omitted.

Here, the width of each of the power wiring lines of the first circuit block 730 and the second circuit block 750 will be described.

Since the first circuit block 730 has the clock control circuit (CCC) 733 and the first buffer circuit 737, the first circuit block 730 approximates to the a circuit block in which the first circuit block 330 and the second circuit block 350 in the first embodiment are combined. For this reason, the minimum width of the power wiring line in the first circuit block 730 is proportional to the sum of a product of a third power of the diagonal screen size and a coefficient, and a product of a second power of the diagonal screen size and a coefficient, as represented by the following equation 10.

$$\text{Minimum Width of Power Wiring Line of First Circuit Block 730} \propto (\text{Diagonal Screen Size})^3 \times \text{Coefficient} + (\text{Diagonal Screen Size})^2 \times \text{Coefficient} \quad (10)$$

Further, in the interface level shift circuit (IF L/S) 751 of the present embodiment, unlike the level shift circuit (L/S) 351 of the first embodiment, a normal leakage current flows. This is because the interface level shift circuit (IF L/S) 751 of the present embodiment needs to boost the signal by four times from 3 V to 12 V, while the level shift circuit (L/S) 351 of the first embodiment boosts the signal by 1.5 times from 8 V to 12 V, and has the different configuration from the level shift circuit (L/S) 351 of the first embodiment. The above-described normal leakage current is determined by the configuration of the interface level shift circuit (IF L/S) 751. Accordingly, the normal leakage current is determined by the number of boost signals, that is, the number of interface level shift circuits (IF L/S) 751, and is constant by the diagonal screen size. Further, when the level of an input signal is switched, current consumption exists. Therefore, the current consumption of the interface level shift circuit (IF L/S) 751 is proportional to the sum of a product of the driving frequency of the scanning line 201 and a coefficient, and the normal leakage current, as represented by the following equation 11.

$$\text{Current Consumption of Interface Level Shift Circuit (IF L/S) 751} \propto \text{Coefficient} \times \text{Driving Frequency of Scanning Line 201} + \text{Normal Leakage current} \quad (11)$$

The current consumption of the second buffer circuit 752 is proportional to a product of the electrostatic capacitance of a signal wiring line to be driven and the driving frequency of the scanning line 201, as represented by the following equation 12.

$$\text{Current Consumption of Second Buffer Circuit 752} \propto \text{Electrostatic Capacitance of Signal Wiring Line To Be Driven} \times \text{Driving Frequency of Scanning Line 201} \quad (12)$$

If the fineness is constant, the number of scanning lines 201, the electrostatic capacitance of the signal wiring line to be driven, and the driving frequency of the scanning line 201 are proportional to the diagonal screen size of the display region 310.

On the other hand, the current consumption of the second circuit block 750 is the sum of the current consumption of the second buffer circuit 752 and the current consumption of the interface level shift circuit (IF L/S) 751. In the above-described case, the current consumption of the second circuit block 750 is the sum of a product of a second power of the diagonal screen size and a coefficient, a product of the diagonal screen size and a coefficient, and a product of the normal leakage current and a coefficient, as represented by the following equation 13.

$$\text{Current Consumption of Second Circuit Block 750} = \text{Current Consumption of Second Buffer Circuit 752} + \text{Current Consumption of Interface Level Shift Circuit (IF L/S) 751} \propto (\text{Diagonal Screen Size})^2 \times \text{Coefficient} + \text{Diagonal Screen Size} \times \text{Coefficient} + \text{Normal Leakage current} \times \text{Coefficient} \quad (13)$$

Since the length of the power wiring line in the second circuit block 750 is almost constant by the diagonal screen size, the minimum width of the power wiring line in the second wiring line 750 is proportional to the current consumption of the second circuit block 750. That is, the minimum width of the power wiring line of the second circuit block 750 is proportional to the product of the second power of the diagonal screen size and the coefficient, the product of the diagonal screen size and the coefficient, and the product of the normal leakage current and the coefficient, as represented by the following equation 14.

$$\text{Minimum Width of Power Wiring Line of Second Circuit Block 750} \propto \text{Current Consumption of Second Circuit Block 750} \times \text{Screen Size} \propto (\text{Diagonal Screen Size})^2 \times \text{Coefficient} + \text{Diagonal Screen Size} \times \text{Coefficient} + \text{Normal Leakage current} \times \text{Coefficient} \quad (14)$$

As the equation 13 and the equation 14 are compared with each other, in general, the term of the normal leakage current of the equation 14 is relatively large (several μA to tens μA/piece). Accordingly, if the screen size is equal to or less than a constant value, the minimum width of the power wiring line in the second circuit block 750 becomes large. For example, when the diagonal screen size is 4 inches, resolution of the display screen is VGA, fineness is 200 ppi, an aspect ratio is 4:3, and the frame frequency is 60 Hz, optimally, the width of the power wiring line in the logic circuit block serving as the first circuit block 730 becomes 100 μm, and the width of the power wiring line in the external interface circuit block serving as the second circuit block 750 becomes 300 μm. However, as the screen size becomes large, the difference is decreased, and, when the screen size is about 12 inches, the width of the power wiring line in the logic circuit block is larger than the width of the power wiring line in the external interface circuit block.

From this result, in the present embodiment, the width of the power wiring line 735 and the width of the power wiring line 736 are set to 100 μm, and the width of the power wiring line 755 and the width of the power wiring line 756 are set to 300 μm.

As such, in the first circuit block 730 and the second circuit block 750, current consumption is different, and the widths of the power wiring lines suitable for the first circuit block 730 and the second circuit block 750 can be set. That is, by making the voltage drop in the power wiring line within the constant range so as to prevent the power wiring line from being disconnected due to migration or the like, and keeping the width of the power wiring line to the necessary minimum, the increase in the circuit area of the driving circuit of the liquid crystal display device can be further suppressed. Accordingly, the frame of the liquid crystal display device can be made small, and manufacturing costs can be reduced.

Moreover, in the present embodiment, to the unit shift circuit (S/R) 731, the clock control circuit (CCC) 733, the clock generating circuit (CGC) 734, the first buffer circuit 737, and the NAND circuit 738, two reference potentials are supplied by two power wiring lines. However, like the first embodiment, the first circuit block 730 can be further divided into two circuit blocks of a circuit block 730*a* having the first buffer circuit 737, and a circuit block 730*b* having the unit shift circuit (S/R) 731, the clock control circuit (CCC) 733, the clock generating circuit (CGC) 734, and the NAND circuit 738. That is, the scanning line driving circuit 701 can be divided into three circuit blocks of the circuit block 730*a*, the circuit block 730*b*, and the circuit block 750, and the power wiring lines 735 and 736 can be also divided into two power wiring lines 739*a* and 739*b*, and two power wiring lines 739*c* and 739*d*, respectively. Since the width of the power wiring line is determined in view of the current consumption of the individual power wiring lines, the widths of the power wiring lines suitable for the circuit block 730*a*, the circuit block 730*b*, and the circuit block 750 can be separately set, and thus the width of the power wiring line can be kept to the necessary minimum, while the power wiring line can be prevented from being disconnected due to migration or the like. Therefore, the increase in the circuit area of the driving circuit of the liquid crystal display device can be further suppressed. As a result, the frame of the liquid crystal device can be made small, and thus manufacturing costs can be reduced.

Further, the present embodiment can be combined with the first embodiment. That is, by inputting the signal of 3 V from the external circuit, such as the external IC or the like, and allowing the interface level shift (IF L/S) 751 to boost the signal from 3 V to 8 V, the unit shift circuit (S/R) 731 and the like can be driven with 8 V, and the output signal thereof can be boosted from 8 V to 12 V by the level shift circuit (L/S) and output to the scanning line 201. That is, the scanning line driving circuit 701 can be divided into three circuit blocks of a first circuit block 730, a circuit block 750*a* having the interface level shift circuit (IF L/S) 751 that boosts the signal from 3 V to 8 V, and a circuit block 750*b* that boosts the signal from 8 V to 12 V. Since the widths of the power wiring lines are determined in view of the current consumption of the individual power wiring lines, the widths of the power wiring lines suitable for the first circuit block 730, the circuit block 750*a*, and the circuit block 750*b* can be separately set, and thus the width of the power wiring line can be kept to the necessary minimum, while the power wiring line can be prevented from being disconnected due to migration or the like. Therefore, the increase in the circuit area of the driving circuit of the liquid crystal display device can be further suppressed. Accordingly, the frame of the liquid crystal device can be made small, the boost ratio of the level shift circuits (IF L/S and L/S) can be made small, and thus a high-performance transistor does not needs to be provided. As a result, manufacturing costs can be reduced.

For example, when the diagonal screen size is 4 inches, resolution of the display screen is VGA, fineness is 200 ppi, the aspect ratio is 4:3, and the frame frequency is 60 Hz, optimally, the width of the power wiring line in the first circuit block 730 becomes 30 μm, the width of the power wiring line in the circuit block 750*a* becomes 50 μm, and the width of the power wiring line in the circuit block 750*b* becomes 300 μm.

Third Embodiment

Figure 6:
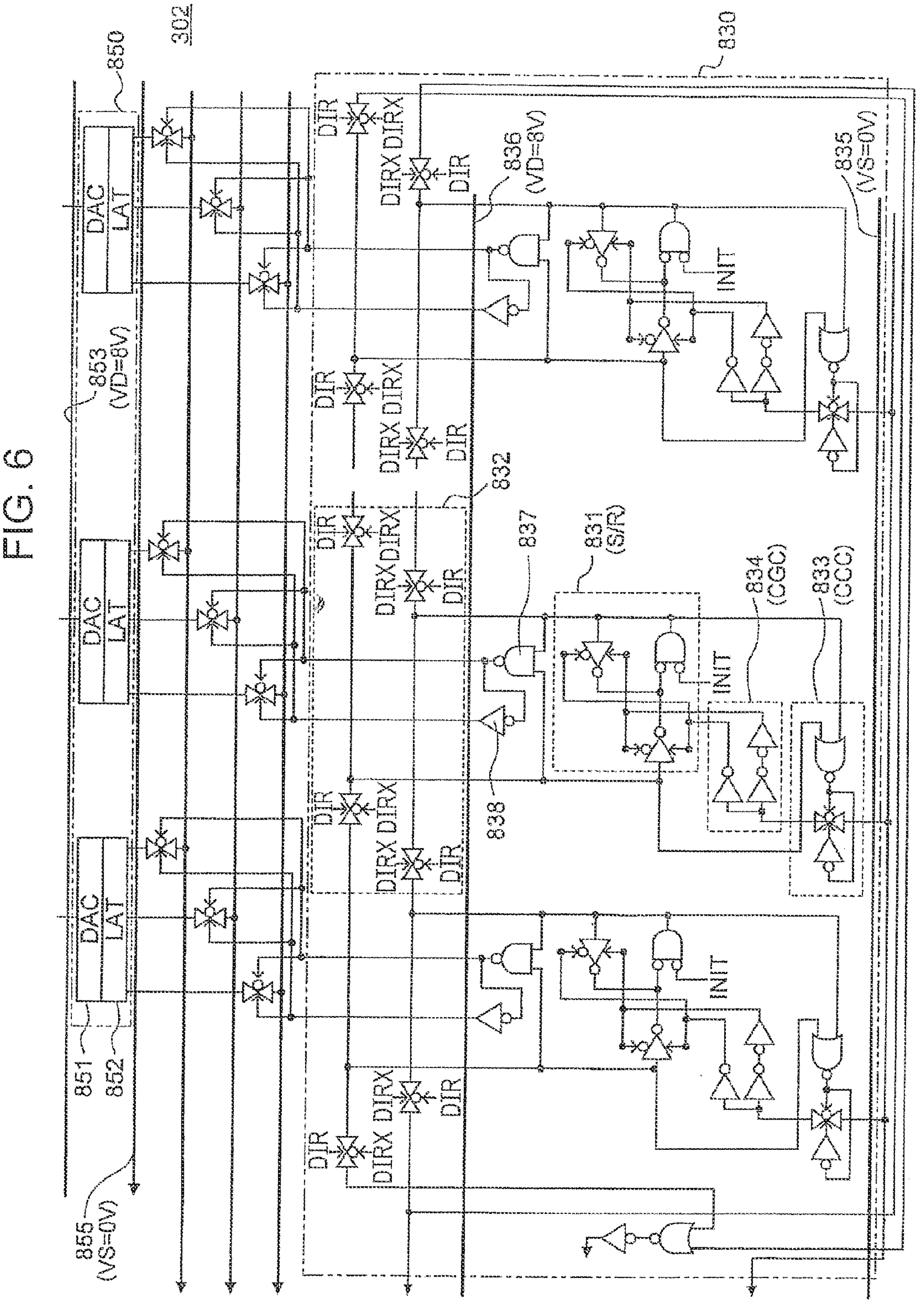
FIG. 6 is a circuit diagram showing a configuration of a data line driving circuit 302 according to a third embodiment of the invention.

FIG. 6 is a circuit diagram of a data line driving circuit 302 according to a third embodiment of the invention. The data line driving circuit 302 has a first circuit block 830, a second circuit block 850, and power wiring lines that supply a plurality of reference potentials.

The first circuit block 830 is a logic circuit block having a clock control circuit (CCC) 833, a clock generating circuit (CGC) 834, a unit shift circuit (S/R) 831, a NAND circuit 837, an inverter circuit 838, and a bidirectional transfer circuit 832.

The unit shift circuit (S/R) 831 as a unit circuit, the clock control circuit (CCC) 833, the clock generating circuit (CGC) 834, and the bidirectional transfer circuit 832 are the same as those in the first embodiment.

The second circuit block 850 is an external interface circuit block having an LAT circuit 852 that holds a digital video signal with a timing to be transmitted from the first circuit block 830, and a DA converter circuit 851 that converts the digital signal to be transmitted from the LAT circuit 852 into an analog signal having a predetermined potential and writes the analog signal into the data line 202. The first circuit block 830 and the second circuit block 850 are driven with 8 V, for example.

Power wiring lines 835 and 855 supply a reference potential VS to the data line driving circuit 302, and power wiring lines 836 and 853 supply a reference potential VD to the data line driving circuit 302. For example, the reference potential VS serving as a ground potential is set to 0 V, and the reference potential VD is set to 8 V.

The first circuit block 830 and the second circuit block 850 receives 8 V as the common reference potential VD and 0 V as the reference potential VS, and operates with 8 V.

In the present embodiment, the first circuit block 830 and the second circuit block 850 are driven with 8 V. In this case, the high reference potential VD is common to the first circuit block 830 and the second circuit block 850 with 8 V, and the low reference potential VS is common to the first circuit block 830 and the second circuit block 850 with 0 V, such that the common wiring line can be made.

Moreover, the power wiring lines are connected to power supply nodes of circuit elements constituting an individual circuit, but, in the drawings, for convenience, the connection to the circuit elements will be omitted.

Here, the width of each of the power wiring lines of the first circuit block 830 and the second circuit block 850 will be described.

The first circuit block 830 has the clock control circuit (CCC) 833, like the first circuit block 330 of the first embodiment. For this reason, the current consumption of the first circuit block 830 is proportional to the diagonal screen size, like the first circuit block 330 of the first embodiment. That is, the minimum width of the power wiring line in the first circuit block 830 is proportional to a second power of the diagonal screen size, as represented by the following equation 15.

$$\text{Minimum Width of Power Wiring Line in First Circuit Block 830} \propto (\text{Diagonal Screen Size})^2 \quad (15)$$

On the other hand, in general, the DA converter circuit has a ladder resistor or an amplifier, and has large current consumption, as compared with, for example, a normal logic circuit, such as the clock generating circuit (CGC) 834 or the like. The current consumption of the single DA converter circuit 851 is proportional to the sum of a product of the electrostatic capacitance of the data line 202 and a driving frequency of the data line, and a normal leakage current, as represented by the following equation 16.

$$\text{Current Consumption of Single DA Converter Circuit 851} \propto \text{Electrostatic Capacitance of Data Line 202} \times \text{Driving Frequency of Data Line 202} + \text{Normal Leakage current} \quad (16)$$

Further, the current consumption of the single LAT circuit 852 is proportional to the driving frequency of the data line 202, as represented by the following equation 17.

$$\text{Current Consumption of Single LAT Circuit 852} \propto \text{Driving Frequency of Data Line 202} \quad (17)$$

If the fineness is constant, the electrostatic capacitance of the data line 202 and the driving frequency of the data line 202 are proportional to the diagonal screen size of the display region 310. Further, the number of DA converter circuits 851 and the number of LAT circuits 852 in the data line driving circuit 302 are individually proportional to the diagonal screen size of the display region 310. Therefore, the current consumption of all of the DA converter circuits 851 is proportional to the sum of a third power of the diagonal screen size, and a product of the diagonal screen size, the coefficient and the normal leakage current, as represented by the following equation 18.

$$\text{Current Consumption of All DA Converter Circuits 851} \propto \text{Current Consumption of Single DA Converter Circuit 851} \times \text{The Number of DA Converter Circuits 851} \propto (\text{Diagonal Screen Size})^3 + \text{Diagonal Screen Size} \times \text{Coefficient} \times \text{Normal Leakage current} \quad (18)$$

Further, the current consumption of all of the LAT circuits 852 is proportional to a second power of the diagonal screen size, as represented by the following equation 19.

$$\text{Current Consumption of All LAT Circuits 852} \propto \text{Current Consumption of Single LAT Circuit 852} \times \text{The Number of LAT Circuits 852} \propto (\text{Diagonal Screen Size})^2 \quad (19)$$

The current consumption of the second circuit block 850 is the sum of the current consumption of the DA converter circuits 851 and the current consumption of the LAT circuits 852. In the above-described case, the current consumption of the second circuit block 850 is the sum of the product of the third power of the diagonal screen size and the coefficient, the product of the second power of the diagonal screen size and the coefficient, and the product of the diagonal screen size, the coefficient, and the normal leakage current, as represented by the following equation 20.

$$\text{Current Consumption in Second Circuit Block 850} = \text{Current Consumption of All DA Converter Circuits 851} + \text{Current Consumption of All LAT Circuits 852} \propto (\text{Diagonal Screen Size})^3 \times \text{Coefficient} + (\text{Diagonal Screen Size})^2 \times \text{Coefficient} + \text{Diagonal Screen Size} \times \text{Coefficient} \times \text{Normal Leakage current} \quad (20)$$

The length of the power wiring line in the second circuit block 850 is almost proportional to the diagonal screen size. For this reason, the minimum width of the power wiring line of the second circuit block 850 is proportional to a product of the current consumption of the second circuit block 850 and the diagonal screen size. That is, the minimum width of the power wiring line in the second circuit block 850 is proportional to the sum of a product of a fourth power of the diagonal screen size and the coefficient, the product of the third power of the diagonal screen size and the coefficient, the product of the second power of the diagonal screen size, the coefficient, and the normal leakage current, as represented by the following equation 21.

$$\text{Minimum Width of Power Wiring Line in Second Circuit Block 850} \propto \text{Current Consumption in Second Circuit Block 850} \times \text{Diagonal Screen Size} \propto (\text{Diagonal Screen Size})^4 \times \text{Coefficient} + (\text{Diagonal Screen Size})^3 \times \text{Coefficient} + (\text{Diagonal Screen Size})^2 \times \text{Coefficient} \times \text{Normal Leakage current} \quad (21)$$

As the equation 21 and the equation 15 are compared with each other, in general, the current consumption of the second circuit block 850 is significantly larger than the current consumption of the first circuit block 830. Here, since the widths of the power wiring lines are set from the current consumption of the individual power wiring lines, the width of the common power wiring line suitable for each of the first circuit block 830 and the second circuit block 850 can be separately set. Therefore, by keeping the width of the power wiring line to the necessary minimum, while preventing the power wiring line from being disconnected due to migration or the like, the increase in the circuit area of the driving circuit of the liquid crystal display device can be further suppressed. As a result, the frame of the liquid crystal device can be made small, and thus manufacturing costs can be reduced.

For example, when the diagonal screen size is 4 inches, resolution of the display screen is VGA, fineness is 200 ppi, the aspect ratio 4:3, and the frame frequency is 60 Hz, optimally, the width of the power wiring line in the logic circuit block serving as the first circuit block 830 becomes 30 μm, and the width of the power wiring line in the external interface circuit block serving as the second circuit block 850 becomes 100 μm. That is, the width of the power wiring line 835 and the width of the power wiring line 836 are set to 30 μm, and the width of the power wiring line 853 and the width of the power wiring line 855 are set to 100 μm.

Fourth Embodiment

Figure 7:
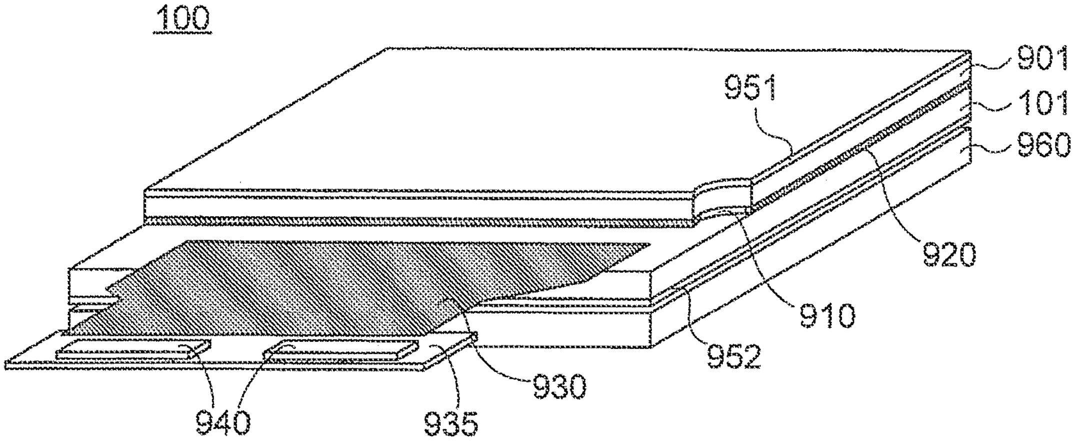
FIG. 7 is a perspective view (in partial cross-section) showing a configuration of a liquid crystal display device in which a driving circuit of an electro-optical device is incorporated.

Next, an electronic apparatus to which the driving circuit of an electro-optical device according to each of the above-described embodiments is applied will be described. FIG. 7 is a perspective view (partial cross-sectional view) showing the configuration of a liquid crystal display device in which the driving circuit of an electro-optical device according to each of the above-described embodiments is incorporated. A counter substrate 901 on which a common electrode is formed by film-forming ITO on a color filter substrate is bonded to the active matrix substrate 101 by a sealant 920, and liquid crystal elements 910 are sealed therebetween. Though not shown, on surfaces of the active matrix substrate 101 and the counter substrate 901 that are brought into contact with the liquid crystal elements 910, alignment materials formed of polyimide or the like are coated and are subjected to a rubbing treatment in directions crossing to each other. Further, connecting members are arranged in the opposing connecting portions 304 on the active matrix substrate 101, and are short-circuited to the common electrode of the counter substrate 901.

The active matrix substrate 101 is connected to 1 to a plurality of driving ICs 940 on a driving circuit board 935 through a flexible board 930 mounted on the active matrix substrate 101, and are supplied with required electrical signals and potentials.

In addition, an upper polarizing plate 951 is arranged outside the counter substrate 901, and a lower polarizing plate 952 is arranged outside the active matrix substrate 101. At this time, the upper polarizing plate 951 and the lower polarizing plate 952 are arranged such that the polarization directions thereof are cross each other (crossed Nicols). In addition, a backlight unit 960 is arranged outside the lower polarizing plate 952. The backlight unit 960 may be a unit in which a light guide plate or a scattering plate is mounted on a cold-cathode tube or a unit which emits light by an inorganic or organic LED element. Though not shown, if necessary, a protective glass or an acrylic board may be mounted to cover an outer shell or on the upper polarizing plate. Further, an optical compensating film may be adhered in order to improve a viewing angle.

Modification and Improvement

Moreover, the invention is not limited to the above-described embodiments, but modifications and improvement in the scope capable of achieving the advantages of the invention still fall within the invention. For example, the invention may be implemented by combining the distinguishable portions of the above-described embodiments.

For example, though the electro-optical device having the driving circuit has been described in each of the above-described embodiments, the invention is not limited to this configuration. For example, a driving circuit that is mounted on a film by using, for example, a tape automated bonding (TAB) technology may be electrically and mechanically connected to an element substrate as an electro-optical device through an anisotropic conductive film, which is provided at a predetermined position on the element substrate, instead of all or part of the driving circuit being formed on the element substrate. Further, the IC chip on which the driving circuit is formed may be connected to a predetermined position on the element substrate, in which the electro-optical device is formed, by using a chip on glass (COG) technology.

Further, though the tolerance of the voltage drop in all circuit blocks is constant in the present embodiment, the tolerance of the voltage drop may be changed for each circuit block according to the optimization of the circuit block. For example, in a digital circuit block, the tolerance is made large in a range where an erroneous operation does not occur, while, in an analog circuit block, the tolerance is made small such that display quality is not influenced. Further, though the width is calculated from the voltage drop of the power supply in the present embodiment, the width may be determined by the current density of the wiring line according to demands, such as a manufacturing process and the like.

Further, though the high-potential power wiring line and the low-potential power wiring line in the same circuit block have the same width in the present embodiment, for example, the high-potential power wiring line and the low-potential power wiring line may have different widths according to causes, such as a difference in characteristic between an n-type transistor and a p-type transistor and the like.

Electronic Apparatus

Figure 8:
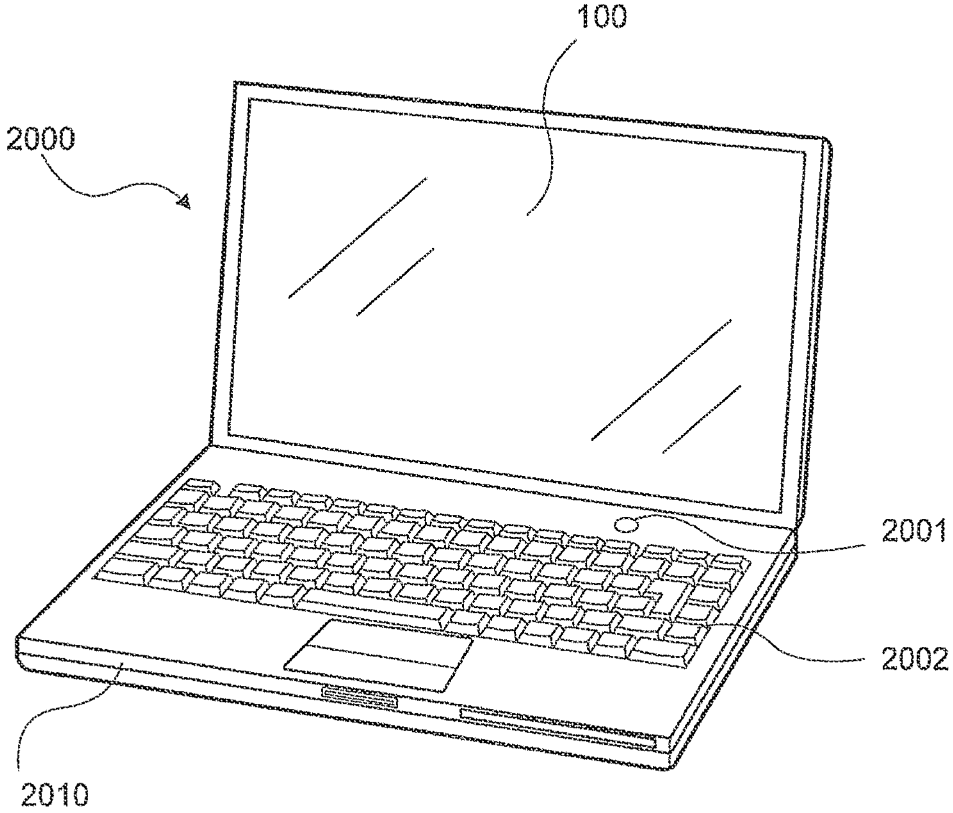
FIG. 8 is a perspective view showing a configuration of a mobile-type personal computer to which the above-described electro-optical device is applied.

Next, electronic apparatuses, to each of which the electro-optical device 100 according to each of the above-described embodiments and the modifications is applied, will be described. FIG. 8 shows the configuration of a mobile-type personal computer to which the electro-optical device 100 is applied. A personal computer 2000 has the electro-optical device 100 serving as a display unit, and a main body 2010. In the main body 2010, a power switch 2001 and a keyboard 2002 are provided. In the electro-optical device 100, the width of the power wiring line is optimized, and a frame is made small with sufficient reliability. As a result, the personal computer 2000 can be also reduced in size.

Figure 9:
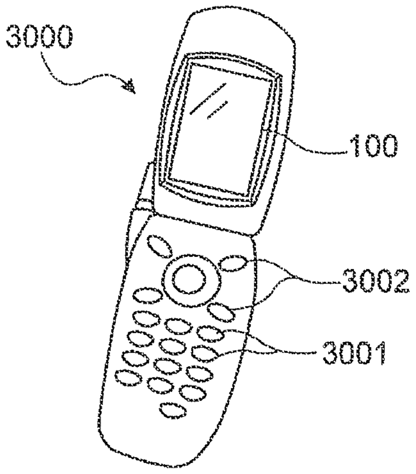
FIG. 9 is a perspective view showing a configuration of a cellular phone to which the above-described electro-optical device is applied.
Figure 10:
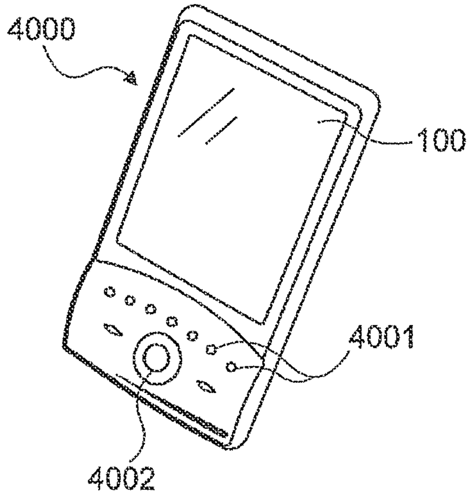
FIG. 10 is a perspective view showing a configuration of a personal digital assistant to which the above-described electro-optical device is applied.

FIG. 9 shows the configuration of a cellular phone to which the electro-optical device 100 is applied. A cellular phone 3000 has a plurality of operating buttons 3001, scroll buttons 3002, and the electro-optical device 100 serving as a display unit. By operating the scroll buttons 3002, a screen displayed on the electro-optical device 100 is scrolled. FIG. 10 shows the configuration of a personal digital assistant (PDA) to which the electro-optical device 100 is applied. A personal digital assistant 4000 has a plurality of operating buttons 4001, a power switch 4002, and the electro-optical device 100 serving as a display unit. If the power switch 4002 is operated, various kinds of information, such as a directory, a scheduler, and the like, are displayed on the electro-optical device 100.

Moreover, as the electronic apparatus to which the electro-optical device 100 is applied, in addition to the apparatuses shown in FIGS. 8 to 10, a digital still camera, a liquid crystal television, a viewfinder-type or monitor-direct-view-type video tape recorder, a car navigation device, a pager, an electronic organizer, an electronic calculator, a word processor, a workstation, a video phone, a POS terminal, and an apparatus having a touch panel can be exemplified. Further, as display units of these electronic apparatuses, the above-described electro-optical device 100 can be applied.

What is claimed is:

1. An electro-optical substrate comprising:

a scanning line;

a data line;

a switching unit which is disposed at a first position corresponding to an intersection of the scanning line and the data line;

a pixel electrode which is disposed at a second position corresponding to the first position;

a driving circuit that includes a first circuit block having at least one of a clock control circuit, a clock generating circuit, a unit shift circuit, a logic circuit, and an inverter circuit and a second circuit block having at least one of a level shift circuit that amplifies a low-amplitude signal to a high-amplitude signal and a buffer circuit; and a common power wiring line that is electrically connected to the first circuit block and the second circuit block, the common power wiring line having a first part that has a first resistance and a second part that has a second resistance, the first part being positioned closer to the first circuit block than the second part, the second part being positioned closer to the second circuit block than the first part, and the first resistance being different from the second resistance.

2. The electro-optical substrate according to claim 1, a first current consumption of the first circuit block being different than a second current consumption of the second circuit block.

3. An electro-optical substrate comprising:
a scanning line;
a data line;
a switching unit which is disposed at a first position corresponding to an intersection of the scanning line and the data line;
a pixel electrode which is disposed at a second position corresponding to the first position;
a driving circuit that includes a first circuit block having at least one of a clock control circuit, a clock generating circuit, a unit shift circuit, a logic circuit, and an inverter circuit and a second circuit block having at least one of a level shift circuit that amplifies a low-amplitude signal to a high-amplitude signal and a buffer circuit; and
a common power wiring line that is electrically connected to the first circuit block and the second circuit block,
the common power wiring line having a first part and a second part,
the first part being positioned between the first circuit block and the second part,
the second part being positioned between the second circuit block and the first part, and
the first part having a first resistance different from a second resistance of the second part.

4. An electro-optical substrate comprising:
a scanning line;
a data line;
a transistor which is disposed at a first position corresponding to an intersection of the scanning line and the data line;
a pixel electrode which is disposed at a second position corresponding to the first position;
a driving circuit that includes a first circuit block having at least one of a clock control circuit, a clock generating circuit, a unit shift circuit, a logic circuit, and an inverter circuit and a second circuit block having at least one of a level shift circuit that amplifies a low-amplitude signal to a high-amplitude signal and a buffer circuit; and
a common power wiring line that is electrically connected to the first circuit block and the second circuit block,
the common power wiring line having a first part that extends along a first direction and a second part that extends along the first direction,
the first part being positioned between the first circuit block and the second part,
the second part being positioned between the second circuit block and the first part, and
the first part having a first resistance along the first direction different from a second resistance of the second part along the first direction.

5. The electro-optical substrate according to claim 4, wherein the first resistance of the first part being larger than the second resistance of the second part.

6. The electro-optical substrate according to claim 4, a first current consumption of the first circuit block being different than a second current consumption of the second circuit block.

7. The electro-optical substrate according to claim 4,
a first current flowing through the first part,
a second current flowing through the second part,
a first quantity of the first current per unit time being different from a second quantity of the second current.

8. The electro-optical substrate according to claim 4,
the first current flowing to the first circuit block not through the second part, and
the second current flowing to the second circuit block not through the first part.

9. An electro-optical substrate comprising:
a scanning line;
a data line;
a transistor which is disposed at a first position corresponding to an intersection of the scanning line and the data line;
a plurality of first circuit blocks that include a plurality of unit shift circuits, or a plurality of logic circuits, or a plurality of inverter circuits;
a plurality of second circuit blocks that include a plurality of level shift circuits or a plurality of buffer circuits;
a first power wiring line that is electrically connected to the plurality of first circuit blocks;
a second power wiring line that is electrically connected to the plurality of second circuit blocks;
a first current that is supplied to the plurality of first circuit blocks flowing through the first power wiring line; and
a second current that is supplied to the plurality of second circuit blocks flowing through the second power wiring line the plurality of unit shift circuits, or the plurality of logic circuits, or the plurality of inverter circuits being arranged along a first direction,
the plurality of level shift circuits or a plurality of buffer circuits being arranged along the first direction,
the first power wiring line extending along the first direction and having a first resistance along the first direction,
the second power wiring line extending along the first direction and having a second resistance along the first direction,
the first resistance being different from the second resistance.

10. The electro-optical substrate according to claim 9, a first quantity of the first current per unit time being different from a second quantity of the second current.

11. The electro-optical substrate according to claim 9, the first power wiring line being positioned between the plurality of unit shift circuits, or the plurality of logic circuits, or the plurality of inverter circuits and the second power wiring line.

12. The electro-optical substrate according to claim 9, the second power wiring line being positioned between the plurality of level shift circuits or a plurality of buffer circuits and the first power wiring line.

13. The electro-optical substrate according to claim 9, the first power wiring line being electrically connected to the second power wiring line.

14. An electro-optical device comprising:
a scanning line;
a data line;
a switching unit which is disposed at a first position corresponding to an intersection of the scanning line and the data line;
a pixel electrode which is disposed at a second position corresponding to the first position;
a driving circuit that includes a first circuit block having at least one of a clock control circuit, a clock generating circuit, a unit shift circuit, a logic circuit, and an inverter circuit and a second circuit block having at least one of a level shift circuit that amplifies a low-amplitude signal to a high-amplitude signal and a buffer circuit; and
a common power wiring line that is electrically connected to the first circuit block and the second circuit block, the common power wiring line having a first part that has a first resistance and a second part that has a second resistance, the first part being positioned closer to the first circuit block than the second part, the second part being positioned closer to the second circuit block than the first part, and the first resistance being different from the second resistance.

15. The electro-optical device according to claim 14, a first current consumption of the first circuit block being different than a second current consumption of the second circuit block.

16. An electro-optical device comprising:

a scanning line;

a data line;

a switching unit which is disposed at a first position corresponding to an intersection of the scanning line and the data line;

a pixel electrode which is disposed at a second position corresponding to the first position;

a driving circuit that includes a first circuit block having at least one of a clock control circuit, a clock generating circuit, a unit shift circuit, a logic circuit, and an inverter circuit and a second circuit block having at least one of a level shift circuit that amplifies a low-amplitude signal to a high-amplitude signal and a buffer circuit; and a common power wiring line that is electrically connected to the first circuit block and the second circuit block, the common power wiring line having a first part and a second part, the first part being positioned between the first circuit block and the second part, the second part being positioned between the second circuit block and the first part, and the first part having a first resistance different from a second resistance of the second part.

17. An electro-optical device comprising:

a scanning line;

a data line;

a transistor which is disposed at a first position corresponding to an intersection of the scanning line and the data line;

a pixel electrode which is disposed at a second position corresponding to the first position;

a driving circuit that includes a first circuit block having at least one of a clock control circuit, a clock generating circuit, a unit shift circuit, a logic circuit, and an inverter circuit and a second circuit block having at least one of a level shift circuit that amplifies a low-amplitude signal to a high-amplitude signal and a buffer circuit; and a common power wiring line that is electrically connected to the first circuit block and the second circuit block, the common power wiring line having a first part that extends along a first direction and a second part that extends along the first direction, the first part being positioned between the first circuit block and the second part, the second part being positioned between the second circuit block and the first part, and the first part having a first resistance along the first direction different from a second resistance of the second part along the first direction.

18. The electro-optical device according to claim 17, wherein the first resistance of the first part being larger than the second resistance of the second part.

19. The electro-optical device according to claim 17, a first current consumption of the first circuit block being different than a second current consumption of the second circuit block.

20. The electro-optical device according to claim 17, a first current flowing through the first part, a second current flowing through the second part, a first quantity of the first current per unit time being different from a second quantity of the second current.

21. The electro-optical device according to claim 17, the first current flowing to the first circuit block not through the second part, and the second current flowing to the second circuit block not through the first part.

22. An electro-optical device comprising:

a scanning line;

a data line;

a transistor which is disposed at a first position corresponding to an intersection of the scanning line and the data line;

a plurality of first circuit blocks that include a plurality of unit shift circuits, or a plurality of logic circuits, or a plurality of inverter circuits;

a plurality of second circuit blocks that include a plurality of level shift circuits or a plurality of buffer circuits;

a first power wiring line that is electrically connected to the plurality of first circuit blocks;

a second power wiring line that is electrically connected to the plurality of second circuit blocks;

a first current that is supplied to the plurality of first circuit blocks flowing through the first power wiring line; and a second current that is supplied to the plurality of second circuit blocks flowing through the second power wiring line the plurality of unit shift circuits, or the plurality of logic circuits, or the plurality of inverter circuits being arranged along a first direction, the plurality of level shift circuits or a plurality of buffer circuits being arranged along the first direction, the first power wiring line extending along the first direction and having a first resistance along the first direction, the second power wiring line extending along the first direction and having a second resistance along the first direction, the first resistance being different from the second resistance.

23. The electro-optical device according to claim 22, a first quantity of the first current per unit time being different from a second quantity of the second current.

24. The electro-optical device according to claim 22, the first power wiring line being positioned between the plurality of unit shift circuits, or the plurality of logic circuits, or the plurality of inverter circuits and the second power wiring line.

25. The electro-optical device according to claim 22, the second power wiring line being positioned between the plurality of level shift circuits or a plurality of buffer circuits and the first power wiring line.

26. The electro-optical device according to claim 22, the first power wiring line being electrically connected to the second power wiring line.

27. The electronic apparatus comprising the electro-optical substrate according to claim 9.

* * * * *